(12) United States Patent
Scheirs

(10) Patent No.: US 8,864,946 B2
(45) Date of Patent: Oct. 21, 2014

(54) DISPOSAL OF ELECTRICAL AND ELECTRONIC EQUIPMENT

(75) Inventor: John Scheirs, Edithvale (AU)

(73) Assignee: P-Fuel Ltd, Victoria (AU)

( * ) Notice: Subject to any disclaimer, the term of this patent is extended or adjusted under 35 U.S.C. 154(b) by 913 days.

(21) Appl. No.: 13/059,878

(22) PCT Filed: Aug. 18, 2009

(86) PCT No.: PCT/AU2009/001055
§ 371 (c)(1),
(2), (4) Date: May 10, 2011

(87) PCT Pub. No.: WO2010/019993
PCT Pub. Date: Feb. 25, 2010

(65) Prior Publication Data
US 2011/0230689 A1    Sep. 22, 2011

(30) Foreign Application Priority Data
Aug. 20, 2008 (AU) .................... 2008904271

(51) Int. Cl.
| | |
|---|---|
| C10G 1/10 | (2006.01) |
| C10B 53/07 | (2006.01) |
| C22B 7/00 | (2006.01) |
| C22B 25/06 | (2006.01) |
| B29B 17/02 | (2006.01) |
| B29K 705/00 | (2006.01) |
| B29B 17/04 | (2006.01) |
| B29L 31/30 | (2006.01) |

(52) U.S. Cl.
CPC ............ B29B 17/02 (2013.01); C22B 7/003 (2013.01); *B29K 2705/00* (2013.01);
(Continued)

(58) Field of Classification Search
CPC .. C10B 53/07; C10G 1/10; C10G 2300/1003; C10G 2300/205; C10G 2400/02; C10G 2400/04; C22B 7/00; C22B 7/001; C22B 7/003; B09B 3/00; F23G 5/033; B29B 17/02; B29B 2017/0496; B29K 2705/00; B29L 2031/3061

USPC ............ 201/19; 585/240–241; 110/341, 346; 588/301, 321
See application file for complete search history.

(56) References Cited

U.S. PATENT DOCUMENTS

| | | | |
|---|---|---|---|
| 4,050,900 A | * | 9/1977 | Hobbs et al. ................. 422/605 |
| 4,118,282 A | | 10/1978 | Wallace |

(Continued)

FOREIGN PATENT DOCUMENTS

| | | |
|---|---|---|
| CN | 1127554 A | 7/1996 |
| CN | 1260250 A | 7/2000 |

(Continued)

OTHER PUBLICATIONS

Chen Lie-qiang et al., "Techniques for Recycling and Disposal of Scrape Electrical & Electronic Equipment," Environmental Science and Technology, vol. 28, No. 3, May 2005 (Chinese with English Abstract).

(Continued)

*Primary Examiner* — Nina Bhat
*Assistant Examiner* — Jonathan Miller
(74) *Attorney, Agent, or Firm* — Banner & Witcoff, Ltd.

(57) ABSTRACT

A method for disposing electrical and electronic equipment comprising plastic and metal components, the method comprising: melt processing the equipment and/or comminuted parts thereof to form a melt processed product; transferring the melt processed product into a vessel and heating the product using far infrared radiation such that it liberates volatile hydrocarbons and leaves behind non-volatile residue comprising metal; and collecting one or both of the volatile hydrocarbons and the non-volatile residue for subsequent use.

18 Claims, 1 Drawing Sheet

(52) U.S. Cl.
CPC ......... *B29B 2017/0496* (2013.01); *C22B 25/06* (2013.01); *C10G 2400/02* (2013.01); *B29L 2031/3061* (2013.01); *C10B 53/07* (2013.01); *C10G 2300/1003* (2013.01); *C10G 2300/205* (2013.01); *C10G 2400/04* (2013.01); *C10G 1/10* (2013.01); *C22B 7/001* (2013.01)
USPC ............. 201/19; 585/241; 110/346; 588/301; 588/321

(56) References Cited

U.S. PATENT DOCUMENTS

| | | | | |
|---|---|---|---|---|
| 4,202,282 | A * | 5/1980 | Hobbs et al. | 110/346 |
| 4,647,443 | A * | 3/1987 | Apffel | 423/449.7 |
| 4,917,023 | A * | 4/1990 | Jones | 110/230 |
| 6,523,764 | B2 | 2/2003 | Ueno et al. | |
| 6,877,444 | B2 * | 4/2005 | Kawase | 110/229 |
| 7,048,832 | B2 | 5/2006 | Lemmons et al. | |
| 7,927,465 | B2 * | 4/2011 | Novak | 204/157.15 |
| 8,354,005 | B2 * | 1/2013 | Kasin | 201/2.5 |
| 2003/0130548 | A1 | 7/2003 | Lemmons et al. | |
| 2004/0111854 | A1 * | 6/2004 | Kamimura et al. | 29/403.3 |
| 2005/0246879 | A1 | 11/2005 | Kamimura et al. | |
| 2007/0054106 | A1 | 3/2007 | Armstrong et al. | |
| 2009/0129996 | A1 | 5/2009 | Beyer et al. | |
| 2013/0055632 | A1 * | 3/2013 | Petry et al. | 44/605 |

FOREIGN PATENT DOCUMENTS

| | | |
|---|---|---|
| CN | 1284537 A | 2/2001 |
| CN | 2425704 Y | 4/2001 |
| CN | 2435146 Y | 6/2001 |
| CN | 1433851 A | 8/2003 |
| CN | 1482950 A | 3/2004 |
| CN | 101006125 A | 7/2007 |
| JP | 08-290148 | 11/1996 |
| JP | 09-221682 | 8/1997 |
| JP | 09-234447 | 9/1997 |
| JP | 09-235563 | 9/1997 |
| JP | 11-021563 | 1/1999 |
| JP | 2000-254621 | 9/2000 |
| JP | 2002-145569 A | 5/2002 |
| JP | 2003055669 A | 2/2003 |
| JP | 2005-187794 | 7/2005 |
| KR | 100265273 B1 | 11/1997 |
| KR | 20010087796 | 9/2001 |
| KR | 10-20040068081 | 7/2004 |
| WO | 2005065006 A1 | 7/2005 |

OTHER PUBLICATIONS

Chinese Search Report dated Jul. 20, 2012 based on Application No. 200980137105.9, filed Aug. 18, 2009.

Dalrymple et al., "An integrated approach to electronic waste (WEEE) recycling," Circuit World, vol. 33, No. 2, 2007, pp. 52-58.

Mohabuth and Miles, "The recovery of recyclable materials from Waste Electrical and Electronic Equipment (WEEE) by using vertical vibration separation," Resources, Conservation and Recycling, 2005, vol. 45, pp. 60-69.

Morf et al., "Brominated Flame Retardants in Waste Electrical and Electronic Equipment: Substance Flows in a Recycling Plant," Environ. Sci. Technol., 2005, vol. 39, pp. 8691-8699.

Schlummer and Maurer, "Recycling of Styrene Polymers from Shredded Screen Housings Containing Brominated Flame Retardants," Journal of Applied Polymer Science, 2006, vol. 102, pp. 1262-1273.

Tange and Drohmann, "Waste electrical and electronic equipment plastics with brominated flame retardants—from legislation to separate treatment—thermal processes," Polymer Degradation and Stability, 2005, vol. 88, pp. 35-40.

International Search Report, Sep. 2009.

* cited by examiner

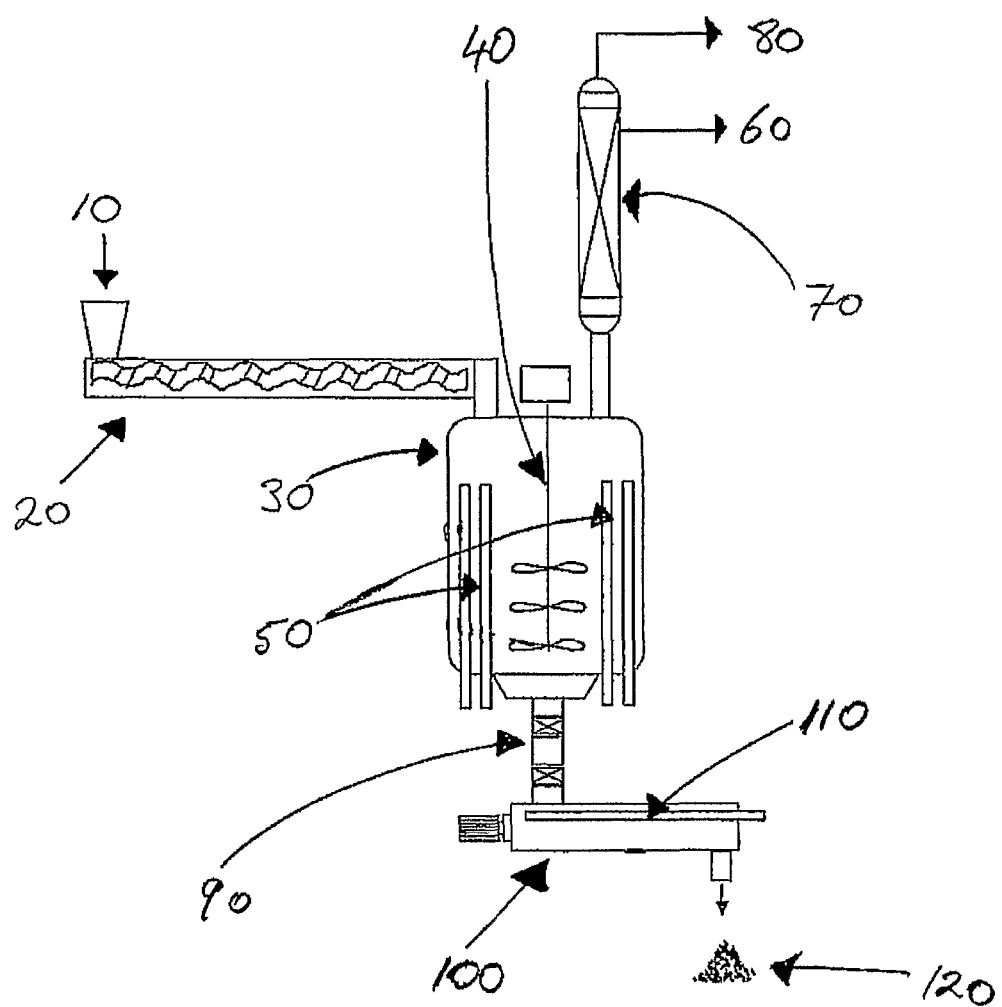

DISPOSAL OF ELECTRICAL AND ELECTRONIC EQUIPMENT

FIELD OF THE INVENTION

The present invention relates in general to the disposal of electrical and electronic equipment, and in particular to a method for disposing such equipment so as to recover usable products therefrom.

BACKGROUND OF THE INVENTION

As with most unwanted consumer products, unwanted electrical and electronic equipment eventually finds its way into municipal waste stations for disposal. Until recently, the most common method of disposal was to simply bury the waste electrical and electronic equipment (commonly referred to as "WEEE" or "e-waste") in land-fill sites. However, with increased environmental awareness, there are growing concerns about disposing WEEE in this manner. For example, in the 1990's some European countries introduced laws banning the disposal of WEEE in land-fills.

With the trend of banning the disposal of WEEE in land-fill sites expected to expand in the future, new techniques for disposing of the waste will need to be developed. If disposed of correctly, WEEE can provide a valuable source of secondary raw materials. For example, common components of WEEE include numerous types of plastic and elements such as lead, tin, copper, silicon, beryllium, carbon, iron, aluminium, cadmium, mercury, thallium, americium, antimony, arsenic, barium, bismuth, boron, cobalt, europium, gallium, germanium, gold, indium, lithium, manganese, nickel, niobium, palladium, platinum, rhodium, ruthenium, selenium, silver, tantalum, terbium, thorium, titanium, vanadium, and yttrium. However, if not disposed of correctly (e.g. in land-fill), the common components of WEEE can present a major source of toxins and carcinogens.

Due to their often complex and multi-component structures, disposing or recycling WEEE in a safe, efficient and effective manner has to date proven difficult. One approach that has been used involves shredding the WEEE and using sophisticated equipment to separate the various metal and plastic components. The separated components are then on sold to metal and plastic recyclers. However, the equipment required to separate the complex mixture of shredded components is very expensive. Furthermore, the separation process is far from perfect, which in turn limits applications for the "separated" materials.

An opportunity therefore remains to address or ameliorate one or more disadvantages or shortcomings associated with existing methods for disposing WEEE, or to at least provide a useful alternative method.

SUMMARY OF THE INVENTION

The present invention therefore provides a method for disposing electrical and electronic equipment comprising plastic and metal components, the method comprising:
melt processing the equipment and/or comminuted parts thereof to form a melt processed product;
transferring the melt processed product into a vessel and heating the product using far infrared radiation such that it liberates volatile hydrocarbons and leaves behind non-volatile residue comprising metal; and
collecting one or both of the volatile hydrocarbons and the non-volatile residue for subsequent use.

By the method of the invention, not only can unwanted electrical and electronic equipment be disposed of in a safe, efficient and effective manner, but in doing so a number of valuable secondary raw materials can be isolated from the equipment. In particular, plastic from the electrical and electronic equipment is converted into volatile hydrocarbons that can be collected and used as a petroleum product. Furthermore, non-volatile residue resulting from the method comprises metal from the electrical and electronic equipment. The metal can be subsequently isolated from the collected residue and purified to provide a valuable resource of a variety of metals, including precious metals.

Generally, both the volatile hydrocarbons and the non-volatile residue will be collected for subsequent use.

The present invention therefore also provides for hydrocarbons produced in accordance with the method and metal isolated from non-volatile residue produced in accordance with the method.

In contrast with common techniques for processing electrical and electronic equipment, the method of the present invention does not require diligent separation of metal components from plastic components, or the separation of the metal and plastic into their respective classes. In particular, provided that the electrical and electronic equipment can be melt processed, there is no limitation on the amount or type of metal and plastic components that may be present. This ability to tolerate both metal and plastic components vastly simplifies processing the equipment.

After melt processing the electrical and electronic equipment, the resulting melt processed product is transferred into a vessel where it is exposed into far infrared radiation (FIR). The FIR promotes heating of the product so as to convert plastic material in the product into volatile hydrocarbons and leaving behind non-volatile residue comprising metal. It has been found that the melt processed product can be heated rapidly and in a controlled manner using FIR as a means of heating. This step of the method in effect functions as a simple and efficient means of separating the plastic components from the metal components.

The ability to use in the method of the invention electrical and electronic equipment feedstock that has not undergone diligent separation of plastic and metal components, coupled with employing FIR heating to convert plastic in the feedstock into volatile hydrocarbons, is believed to collectively enhance the effectiveness, efficiency and safety of disposing of and recovering value added products from the feedstock.

Further aspects of the invention are discussed in more detail below.

BRIEF DESCRIPTION OF THE DRAWINGS

Embodiments of the invention will herein be illustrated by way of example only with reference to the accompanying drawing in which:

FIG. 1 shows a process flow diagram of a system that may be used to perform the method according to the invention.

DETAILED DESCRIPTION OF THE INVENTION

The method in accordance with the invention provides means for disposing "electrical and electronic equipment". By "electrical and electronic equipment" is meant consumer products that are constructed from at least plastic and metal materials and comprises one or more features or parts powered by electricity. Such equipment includes, but is not limited to, computers, printers, photocopiers, scanners, telephones, cameras and entertainment devices.

As the method provides means for "disposing" the equipment, it will be appreciated that the equipment will generally be unwanted and considered as waste. Such equipment is commonly referred to in the art as "electronic waste", "e-waste" or "waste electrical and electronic equipment" (WEEE). For convenience, the electrical and electronic equipment used in accordance with the invention will hereinafter simply be referred as WEEE.

The WEEE used in accordance with the invention comprises both metal and plastic components. A wide range of plastic materials are commonly used in the manufacture of electrical and electronic equipment. Such plastic materials include, but are not limited to, polyethylene (PE), polypropylene (PP), acrylonitrile butadiene styrene (ABS), acrylic ester styrene acrylonitrile (ASA), styrene acrylonitrile (SAN), polystyrene (PS), high impact polystyrene (HIPS), polyurethane (PU), epoxy resins (EP), polyvinyl chloride (PVC), polycarbonate (PC), polyamide such as nylon (PA), polyoxymethylene (POM), polyesters such as polybutylene terephthalate (PBT) and polyethylene terephthalate (PET), unsaturated polyester (UP), and combinations or blends thereof.

Of these plastic materials, styrenic plastics such as ABS, ASA, HIPS, SAN and PS, and PP and PC, or blends thereof, account for the majority of plastics used in the manufacture of electronic and electrical equipment.

Those skilled in the art will appreciate that conventional techniques for recycling plastic materials generally not only require the plastic material to be separated from non-plastic material, but also that the isolated plastic material be sorted according to the type of plastic. In view of the diverse range of plastics used in the manufacture of electronic and electrical equipment, conventional recycling techniques are often unsuitable for processing WEEE.

In contrast, the method in accordance with the invention can not only tolerate processing most plastic materials, the plastic materials may be contaminated with non-plastic components such as metal and is therefore particularly suited for processing WEEE. Depending on the type/form of WEEE used in accordance with the invention, it may be necessary to comminute or dismember some or all of the WEEE prior to it being melt processed. For example, the WEEE may be subjected to a comminution process such as crushing or shredding prior to it being melt processed. For convenience, the term "WEEE" used herein is intended to embrace intact and/or dismembered WEEE.

Depending upon the type of WEEE used, it might also be desirable to separate from the feedstock gross metal and non-plastic components such as glass prior to performing the method of the invention. For example, the WEEE in its post consumer form might first be passed into a shredder or hammermill to comminute the equipment. The resulting comminuted equipment might then be passed through a screening process to remove for example glass and toner powder, and then processed using magnetic and Eddy current separation methods to remove bulk or gross magnetic (e.g. ferrous-mainly steel) and non-magnetic (e.g. mainly aluminium) metal components.

Common metals found in WEEE include, but are not limited to, lead, for example in the form of solder or in lead-acid batteries; tin, for example in the form of solder and coatings on component leads; copper, for example in the form of wire, printed circuit board tracks and component leads; cadmium, for example in the form of light-sensitive resistors and corrosion-resistant alloys; aluminium, for example in the form of heat sinks; iron, for example in the form of steel chassis, cases and fixings; nickel and cadmium, for example in the form of nickel-cadmium batteries; zinc, in the form of coatings on steel parts; precious metals such as gold, silver, platinum and palladium, for example in the form of connector plating primarily used in computer equipment; and mercury, for example in the form of tilt switches.

The method of the invention includes melt processing the WEEE to form a melt processed product. By "melt processing" is meant that the WEEE processed in a melt mixing device such that plastic components of the WEEE are transformed into a molten state.

Melt processing may be performed using techniques and equipment well known in the art. Generally, melt processing is achieved using continuous extrusion equipment, such as single screw extruders, twin screw extruders, other multiple screw extruders or Farrell continuous mixes.

Melt processing is conducted for sufficient time and at a suitable temperature to cause the plastic components of the WEEE to become molten. Those skilled in the art will appreciate that the temperature at which the melt processing is conducted will generally depend upon the nature of the plastic components being processed. Generally, the WEEE will be melt processed at a temperature ranging from about 220° C. to about 260° C.

Accordingly, it will be appreciated that the composition of the WEEE that is melt processed will comprise sufficient plastic material to enable melt processing to be conducted. Generally, the WEEE that is melt processed will comprise at least about 70 wt % of plastic material. Electronic and electrical equipment generally comprises only about 20-30 wt % plastic material, but after being crushed and processed to remove gross non-plastic material, its plastic content is typically increased to about 70 wt %.

Plastic materials used in the manufacture of electrical and electronic equipment may comprise numerous additives such as a flame retardant. Common flame retardants include brominated compounds such as polybrominated biphenyls (PBB) and polybrominated diphenyl ethers (PBDE). Common brominated flame retardants include, but are not limited to, tetrabromobisphenol A (TBBPA), decabromodiphenyl ether (DecaBDE), octabromodiphenyl ether (OctaBDE), and 1,2-bis-tribromophenoxyethane (TBPE).

The presence of flame retardants in plastic materials that are melt processed can result in the liberation of toxic compounds such as hydrochloric acid, hydrobromic acid, and chlorinated/brominated dioxins and furans. If such toxic compounds are generated during melt processing of the WEEE, their concentration in the resulting melt processed product can be reduced by subjecting the molten WEEE to a vacuum extraction process. For example, the WEEE may be melt processed using a conventional melt mixing device such as an extruder that is vented to one or more vacuum pumps. Volatile products extracted from the melt may be safely collected using conventional techniques such as by cold trapping and/or scrubbing (e.g. a caustic scrubber to remove extracted acid compounds).

In accordance with the method, the melt processed product formed by melt processing the WEEE is then transferred into a vessel. The melt processed product may be first collected, stored and then transferred into the vessel, but it will generally be transferred directly into the vessel while still in a molten state.

There is no particular limitation on the type of vessel that may be used in accordance with the invention provided it can readily contain the melt processed product and withstand the chemical environment and temperatures experienced during the method. The vessel may, for example, be made from stainless steel. Those skilled in the art may commonly refer to the vessel as a "pyrolysis reactor".

The vessel will also be adapted so as to allow the volatile hydrocarbons liberated from the melt processed product to be collected. For example, the vessel will generally have at least one outlet positioned in the head space above the melt processed product designed to allow for the collection of the volatile hydrocarbons. The volatile hydrocarbons collected will typically be a mixture of compounds such as olefins, paraffins and aromatics. The volatile hydrocarbons may, for example, comprise a mixture of $C_1$-$C_{22}$ hydrocarbon compounds. Those skilled in the art will appreciate that such compounds may be readily used as numerous petroleum products. In one embodiment, the collected volatile hydrocarbons comprise at least one of a diesel, gasoline, and liquid petroleum gas (LPG) fraction.

In addition to being adapted to collect the volatile hydrocarbons, the vessel will also be adapted to allow removal of the non-volatile residue comprising metal. For example, there will generally also be at least one outlet in the vessel designed to remove such residue.

The vessel may also be fitted with a means for agitating or stirring the melt processed product within the vessel so as to promote even heating of the product. For example, the vessel may comprise one or more stirring elements which rotate within the vessel and stir the product.

An important feature of the method is that the melt processed product is heated using FIR such that volatile hydrocarbons are liberated therefrom. Volatile hydrocarbons may be liberated from the product simply by virtue of thermal desorption of hydrocarbons already present in the product, and/or by virtue of the plastic material present in the product being pyrolysed.

Pyrolysis is a well known chemical process for converting organic materials into volatile hydrocarbons. Pyrolysis may also result in the production of non-hydrocarbon volatiles such as hydrogen gas.

In contrast with conventional pyrolysis techniques, the method of the invention allows the melt processed product to be pyrolysed at relatively low temperatures (e.g. by heating the product to temperatures in range of from about 360° C. to about 450° C.). Such low pyrolysis temperatures can be attained due to the efficient and effective transfer of heat from the FIR to the product.

Pyrolysis of the melt processed product will generally be conducted in the absence of oxygen, and may be conducted in the presence of a suitable catalyst to promote thermal cracking of the plastic material in the product.

The ability to rapidly heat and control the temperature of the melt processed product using FIR and then conduct pyrolysis at relatively low temperatures has been found to improve the efficiency of converting the plastic material in the product into volatile hydrocarbons and also reduce the formation of coke within the vessel. Without wishing to be limited by theory, it is believed that relatively low temperatures and short exposure time to such temperatures maximises the formation of volatile hydrocarbons and also reduce the formation of coke within the vessel.

Heating of the melt processed product by FIR may be conducted by any suitable means. For example, one or more FIR heaters may be located within the vessel. Generally, a plurality of FIR heaters will be positioned within the vessel. The FIR heaters therefore provide an "internal" or "direct" means for heating the product, this being in contrast with the "external" or "indirect" means used in conventional pyrolysis techniques.

Those skilled in the art will appreciate that FIR defines the part of the electromagnetic spectrum that falls in between middle infrared radiation and microwave radiation.

Conventional FIR heaters can advantageously be used in accordance with the invention to provide the source of FIR. The FIR heaters will of course be configured to withstand conditions encountered by the method. For example, the FIR heaters may be in the form of ceramic rod elements sheathed with stainless steel sleeves coated with an appropriate emitter compound. The FIR heaters can be positioned with the vessel so as to be in direct contact with the melt processed product and promote efficient and effective heating thereof.

The volatile hydrocarbons liberated from the melt processed product may be collected by any suitable means. Generally, the vessel will be adapted to comprise a reflux column fractionator such that the collected volatile hydrocarbons can be separated according to their boiling point. If desired, lower boiling point fractions (i.e. "lighter" fractions) may be introduced at the top of the column so as to strip by counter current absorption higher boiling point fractions (i.e. "heavy" fractions) from the hydrocarbon vapour rising up the packing inside the column. In this way, higher boiling point fractions may be returned to the reactor to be subjected to further pyrolysis.

The collected hydrocarbons may be then be used in various applications/products or, if desired, subjected to refining in a second reflux column fractionator which may be used to further separate the fractions into more specific petroleum products.

The method of the invention will also generally yield a proportion of non-condensable (at atmospheric pressure) hydrocarbons such as light hydrocarbons in the LPG range. Such hydrocarbon gas can be disposed of by flaring. Alternatively, it may be used to fuel a power generation unit that can generate electricity for powering equipment associated with performing the method of the invention. For example, the generated electricity may be used to power the FIR heaters and other heating and pumping units be used in the method.

Where the WEEE used in accordance with the method comprises plastic material formulated with flame retardant, the melt processed product introduced into the vessel may contain flame retardant or degradation products thereof. As indicated above, the amount of flame retardant degradation products in the melt processed product may be reduced by melt processing the WEEE under reduced pressure.

Despite melt processing the WEEE under reduced pressure, the resulting melt processed product may nevertheless comprise flame retardant and/or degradation products thereof. In that case, heating of the product in the vessel using FIR may volatilise the flame retardant and/or their degradation products resulting in contamination of the liberated hydrocarbons. The volatile hydrocarbon products collected from the vessel may therefore comprise flame retardant compounds and/or their degradation products. Where the presence of such compounds in the collected hydrocarbon stream is undesirable, the hydrocarbons may be subjected to conventional purification techniques such as fractionation and/or scrubbing to remove such contaminants.

As an alternative or additional technique for reducing the amount of flame retardant and/or degradation products thereof that may contaminate the collected hydrocarbons, a zeolite, for example Y-zeolite, may be introduced with the melt processed product into the vessel. In particular, the zeolites are known for their ability to remove brominated compounds from pyrolysis products.

In addition to liberating volatile hydrocarbons, heating of the melt processed product in accordance with the method will also generate non-volatile residue comprising metal. The metal content of the residue will vary depending upon the composition of the WEEE used, with the remainder of the residue generally being in the form of carbonaceous material and any other non-volatile material such as ceramic and glass. For convenience, such residues will hereinafter be collectively referred to as "pyrolytic residues".

The vessel will generally be adapted to readily remove the pyrolytic residues by, for example, an outlet valve located at the bottom of the vessel. The pyrolytic residues removed from the vessel may comprise residual organic materials such as non-pyrolysed plastic and/or heavy liberated hydrocarbons. In that case, the now isolated residue may be subjected to a second heating process, for example by being passed through a FIR heat tunnel, whereby any residual plastic or hydrocarbon present is pyrolysed/volatilised from the residue to yield a relatively free flowing friable pyrolytic residue powder comprising metal. The volatilised hydrocarbons produced by this second heating process may be reintroduced to the vessel to be processed according to the method.

The now isolated pyrolytic residue comprising metal can then be collected for subsequent use. For example, the metal present in the residue may be isolated and purified using conventional isolation/purification techniques. In that case, the residue might first be processed in a reverberatory furnace to collect most of the lead present. The resulting slag can then be processed in a blast furnace where metals such as zinc and tin may be collected from the expelled vapour stream. The blast furnace solids can then be processed in an anode furnace to concentrate the remaining metals in what is commonly referred to as anode slime. This anode slime may then be processed by electrolytic refining to collect other metals. For example, the slime may be processed by copper electrolytic refining to collect copper, with the resulting leach being smeltered to consolidate the remaining metals. The smeltered product may then be subjected to silver electrolytic refining to collect silver. The anode slime from this process will generally be a precious metal (eg gold, platinum, palladium) concentrate which metals can be further purified by conventional means if desired.

The method according to the invention may be performed in a continuous, semi-continuous or batch mode. Generally the method will be operated in a continuous mode.

The method according to the invention may be conducted using a system schematically illustrated in the flow diagram shown in FIG. 1. In that case, WEEE is introduced into the feed throat (10) of a melt mixing device (20) such as an extruder. The melt mixing device may be vented (not shown) to one or more vacuum pumps so as to extract from the molten WEEE volatile components such as flame retardant and/or their degradation products. The resulting melt processed product (not shown) is then introduced into a reactor vessel (30) while still in a molten state. The melt processed product introduced into the vessel may be agitated with a mixing element (40) such as an impellor stirrer.

In accordance with the method, the melt processed product is heated by FIR. The FIR will typically be generated by a plurality of FIR heaters (50). The FIR heaters may comprise ceramic rods sheaved with stainless steel sleaves coated with an appropriate emitter compound. Each FIR heating rod will generally have a minimum heating capacity of 12 kW. The melt processed product will generally be heated to a temperature ranging from about 360° C. to about 450° C. Heating the product will promote liberation of volatile hydrocarbons contained therein and also volatile hydrocarbons formed by pyrolysis. The liberated hydrocarbons (not shown) may be collected at an appropriate location (60) on a reflux column fractionator (70). The collected hydrocarbons may be further purified by being passed through a scrubber (not shown) and/or by being past into a second reflux column fractionator (not shown). Further fractionation may for example enable the volatile hydrocarbons to be separated into specific petroleum products.

The volatile hydrocarbons collected may also comprise non-condensable (at atmospheric pressure) hydrocarbons such as hydrocarbons in the liquid petroleum gas (LPG) range. Such non-condensable hydrocarbons will generally be collected from the top (80) of the reflux column fractionator (70), and may be disposed of by flaring (not shown) or used to fuel a power generation unit (not shown). The power generation unit may be used to power the FIR heaters and electric motors associated with equipment used in the process.

Also connected to the vessel is an outlet port (90) for removing the pyrolytic residues from the vessel. The pyrolytic residues removed from the vessel may comprise residual organic materials such as non-pyrolysed plastic and/or heavy liberated hydrocarbons. In that case, the pyrolytic residue may be discharged into a heat tunnel (100) in which a heating element (110) such as an FIR heater may be used to drive off any volatile hydrocarbons and/or pyrolyse any remaining organic material. Any volatile hydrocarbons formed may be reintroduced to the vessel. Upon being subjected to this further heating process, pyrolytic residue comprising metal in the form of a friable powder (120) is produced.

The pyrolytic residue comprising metal (120) may then be further processed (not shown) so as to isolate and purify metal contained therein.

Such a system may be operated in continuous, semi continuous and batch modes. The system may also be operated substantially closed thereby minimising omissions to the atmosphere.

Embodiments of the invention are further described with reference to the following non-limiting examples.

EXAMPLES

Example 1

WEEE comprising mainly printers and photocopiers was shredded using a Brentwood Industrial Shredders Quad-shaft (four shaft) shredder. Gross metal and glass was then removed from the shredded WEEE by metal separation (magnetic and Eddy current) and screening. The mixed plastics content of the resulting shredded WEEE was about 85 wt. % and comprised mainly HIPS, ABS, PC/ABS, Noryl (PPO-PS), and some polyolefins. The shredded WEEE was then melt processed (extruded) using a vented extruder at 250° C. and passed directly into a stainless steel (SS316) pyrolysis vessel. The melt processed product was then heated from within the vessel by 43 far infra-red heating rods ("inner heating") to about 425° C. to promote pyrolysis of the plastic material. Volatile hydrocarbons liberated during pyrolysis were condensed and collected to yield about 70% (by weight of the melt processed product) of liquid comprised of a mixture of about 50% C11-C22 (diesel) plus about 20% ethyl benzene and about 30% styrene. The remaining non-volatile residue (about 30% by weight of the melt processed product) was removed from the vessel and processed by sequential furnace/smelting/refining processes to yield the following metals Pb (8%), Cu (7%), Fe (7%), Ag (0.4%), Au (0.2%), with the balance being carbon (by weight of the non-volatile residue).

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A method for disposing electrical and electronic equipment comprising plastic and metal components, the method comprising:
   melt processing the equipment and/or comminuted parts thereof to form a melt processed product;
   transferring the melt processed product into a vessel, introducing a zeolite into the vessel together with the melt processed product, and heating the product using far infrared radiation such that it liberates volatile hydrocarbons and leaves behind non-volatile residue comprising metal;
   collecting one or both of the volatile hydrocarbons and the non-volatile residue for subsequent use.

2. The method according to claim 1, wherein the electrical and electronic equipment is subjected to a comminution process prior to it being melt processed.

3. The method according to claim 2, wherein prior to being melt processed the comminuted electrical and electronic equipment is subjected to a separation process that removes at least magnetic components therefrom.

4. The method according to claim 1, wherein the electrical and electronic equipment and/or comminuted parts thereof is melt processed using an extruder that is vented to one or more vacuum pumps so as to remove volatile compounds from the melt.

5. The method according to claim 4, wherein the volatile compounds removed by the vacuum pump are collected in a cold trap and/or passed through a caustic scrubber.

6. The method according to claim 1, wherein the melt processing is conducted at a temperature ranging from about 220° C. to about 260° C.

7. The method according to claim 1, wherein the far infrared radiation is provided by a plurality of far infrared radiation heaters that are each at least in part immersed within the melt processed product.

8. The method according to claim 7, wherein the far infrared heaters are in the form of ceramic rod elements sheathed with stainless steel sleeves that are coated with an emitter compound.

9. The method according to claim 1, wherein the melt processed product is heated by the far infrared radiation to a temperature ranging from about 360° C. to about 450° C.

10. The method according to claim 1, wherein the volatile hydrocarbons are collected using a reflux column fractionator.

11. The method according to claim 1, wherein the collected volatile hydrocarbons comprise at least one of a diesel, gasoline, and liquid petroleum gas (LPG) fraction.

12. The method according to claim 1, wherein prior to collection the non-volatile residue is discharged from the vessel and heated using far infrared radiation to drive off any residual volatile hydrocarbons.

13. The method according to claim 1, further comprising purifying and isolating metal contained in the collected non-volatile residue.

14. The method according to claim 13, wherein the metal is purified and isolated by processing the collected non-volatile residue in a processing step selected from the group consisting of using one or more of a reverberatory furnace, blast furnace, anode furnace, and electrolytic refining technique.

15. The method according to claim 13, wherein the purified and isolated metal is selected from the group consisting of lead, tin, copper, cadmium, aluminium, iron, nickel, zinc, gold, silver, platinum, palladium, and blends thereof.

16. The method according to claim 6, wherein the melt processed product is heated by the far infrared radiation to a temperature ranging from about 360° C. to about 450° C.

17. The method according to claim 16, wherein the collected volatile hydrocarbons comprise at least one of a diesel, gasoline, and liquid petroleum gas (LPG) fraction.

18. The method according to claim 17, wherein the purified and isolated metal is selected from one or more of lead, tin, copper, cadmium, aluminium, iron, nickel, zinc, gold, silver, platinum and palladium.

* * * * *